US005918465A

United States Patent [19]
Schmid

[11] Patent Number: 5,918,465
[45] Date of Patent: Jul. 6, 1999

[54] FLOW GUIDING BODY FOR A GAS TURBINE COMBUSTION CHAMBER

[75] Inventor: Achim Schmid, Berlin, Germany

[73] Assignee: BMW Rolls-Royce GmbH, Oberursel, Germany

[21] Appl. No.: 08/875,640

[22] PCT Filed: Feb. 3, 1995

[86] PCT No.: PCT/EP95/00401

§ 371 Date: Jul. 30, 1997

§ 102(e) Date: Jul. 30, 1997

[87] PCT Pub. No.: WO96/23981

PCT Pub. Date: Aug. 8, 1996

[51] Int. Cl.[6] .......... F02C 1/00

[52] U.S. Cl. .......... 60/722; 60/743; 60/748; 60/759; 239/424.5

[58] Field of Search .......... 60/722, 743, 749, 60/748, 752, 759; 239/423, 424, 424.5, 553

[56] References Cited

U.S. PATENT DOCUMENTS

| | | | |
|---|---|---|---|
| 2,916,878 | 12/1959 | Wirt | 60/759 |
| 2,948,117 | 8/1960 | Nerad et al. . | |
| 3,726,087 | 4/1973 | Bryce | 60/748 |
| 3,974,646 | 8/1976 | Markowski et al. . | |
| 4,781,030 | 11/1988 | Hellat et al. | 60/743 |
| 4,790,140 | 12/1988 | Sato et al. | 60/759 |
| 5,077,969 | 1/1992 | Liang et al. . | |
| 5,235,813 | 8/1993 | McVey et al. . | |
| 5,609,030 | 3/1997 | Althaus | 60/743 |

FOREIGN PATENT DOCUMENTS

| | | |
|---|---|---|
| 0 063 729 | 11/1982 | European Pat. Off. . |
| 0 321 379 | 6/1989 | European Pat. Off. . |
| 0 619 456 | 10/1994 | European Pat. Off. . |
| 0 619 457 | 10/1994 | European Pat. Off. . |
| A 19148 | 2/1958 | German Dem. Rep. . |
| 1752526 | 9/1957 | Germany . |
| 25 55 085 | 6/1976 | Germany . |
| 32 47 169 A1 | 7/1983 | Germany . |
| 35 20 772 | 12/1986 | Germany . |
| 43 25 977 | 2/1995 | Germany . |
| 1107406 | 3/1968 | United Kingdom . |
| 2 106 632 | 4/1983 | United Kingdom . |

*Primary Examiner*—Charles G. Freay
*Attorney, Agent, or Firm*—Evenson, McKeown, Edwards & Lenahan, P.L.L.C.

[57] ABSTRACT

A flow-guiding body is designed as a pointed, substantially conical molded shell. The projection of its base surface is formed by a straight line and by a curve that interconnects the ends of the straight line. The curve forms no significant angles. The molded shell faces with its point the fluid flow that hits its outer side and may be used as a mixing element for gaseous fuel and air, as an air sprayer with flame-holder, as a mixing element for admixed air in combustion chambers, as a swirling element or as a shell-shaped air sprayer combined with a fuel film generator or a fuel pressure spraying nozzle.

10 Claims, 5 Drawing Sheets

FLOW GUIDING BODY FOR A GAS TURBINE COMBUSTION CHAMBER

BACKGROUND AND SUMMARY OF THE INVENTION

The invention relates to a flow guiding body on a gas turbine combustion chamber for spinning an impinging air flow, consisting of at least one acutely tapering molded shell of an essentially conical design, whose surface area projection is formed by at least one straight line as well as an arbitrary curve connecting the end points of the straight line. The molded shell faces the air flow impinging on the outer side essentially with its tip.

From European Patent document EP-A-0 063 729, a comparable flow guiding body is known as an arrangement for inverting and mixing flowing substances.

On gas turbine combustion chambers, particularly for aircraft engines, so-called airblast atomizers are known which have two or more coaxial ring ducts through which the air mass delivered by the compressor flows with different spins. In this context, a mixing with fuel has become known. In this case, two air ducts are separated by a sharply tapering circular ring to which a fuel film is applied. The fuel film is driven by the air masses to the end edge of the circular ring and is atomized there. In the close area of the atomization edge, the fuel drop spray has a boundary-wake characteristic, which results in a poor homogeneity of the resulting fuel air mixture.

Furthermore, a flow guiding body which has an acutely tapering molded shell is known in connection with a fuel feeding system for a combustion chamber from European Patent document EP-A-0 619 456, and in connection with a premixing burner from European Patent document EP-A-0 619 457.

Also, on gas turbines it is known to feed the mixing air for the different combustion zones of a combustion chamber through plain or plunged holes in the combustion chamber wall. Frequently, this takes place in that the individual air jets which penetrate the different holes in the combustion chamber wall meet in a stagnation point and locally cause a high turbulence there. However, in the interior of the combustion chamber, hot gas situated in the interior flows around the blown-in air jets in the manner of a massive rod so that, in the area in which the hot gas and the admixed air meet, there will be no optimal mixing of air. A mixing occurs only in the boundary layer area between the admixed air jet and the hot gas. It is known that this so-called hot gas slip through the hole cross-section of a combustion chamber is relatively high.

For improving the mixing process of gases in or on gas turbine combustion chambers, so-called “delta wings” have also become known. In this respect, reference is made, for example, to European Patent document EP 0 623 786 A1 or U.S. Pat. No. 3,974,646. Such delta wings are sharp-edged bodies which divide an impinging flow field into two partial flows each having a swirl axis such that the swirl axes are convergent. The mixing processes which can be achieved in this manner are not completely satisfactory because of this convergent swirl formation.

It is therefore an object of the invention to indicate measures by which mixing processes of gases in gas turbine combustion chambers can be improved. In particular, non-convergent and preferably divergently extending swirl axes are to be generated downstream of the flow guiding body.

For achieving this object, the present invention provides a flow guiding body on a gas turbine combustion chamber for spinning air flow, consisting of at least one acutely tapering molded shell of an essentially conical design, whose surface area projection is formed by at least one straight line as well as an arbitrary curve connecting the end points of the straight line. The molded shell, essentially with its tip, faces the air flow impinging on the outer side. Advantageous developments and further developments are described herein.

The invention will be explained in detail by means of preferred embodiments.

DETAILED DESCRIPTION OF THE DRAWINGS

Figure 1:
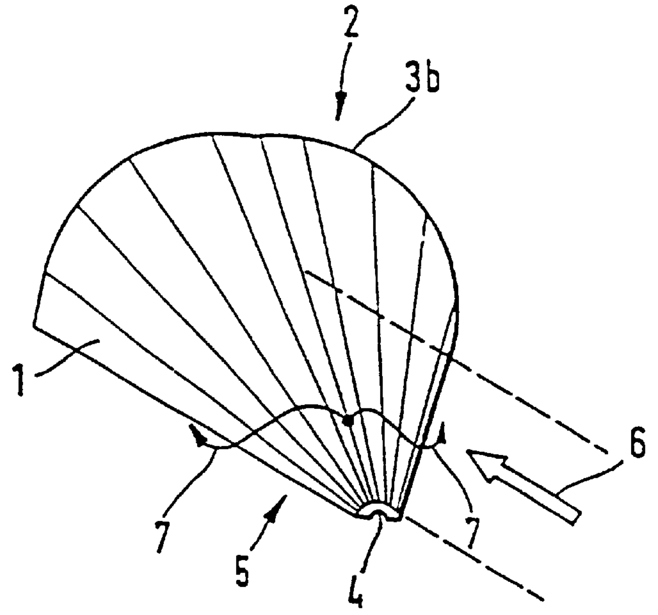
FIG. 1 is a perspective view for explaining the principles of only one flow guiding body (molded shell) as well as of an impinging fluid flow.

In all figures, the so-called flow guiding body has the reference number 1. It is always a molded shell of an essentially conical shape. The projected surface area 2 of this molded shell 1, whose interior is hollow, consists of a straight line 3*a* and of an arbitrary curve 3*b* which connects the end points of the straight line. In this case, the molded shell 1 is formed by the generated surface which connects the curve 3*b* with the tip 4 of the molded shell 1. However, the lines extending from the tip 4 to the curve 3*b* do not necessarily have to be straight but may be curved themselves. Corresponding to the respective requirements, the shape of this molded shell 1 can be freely selected; that is, in a test series, the respective most suitable shape of the curve 3*b* as well as the respective most suitable value of the so-called generating angle α of the cone formed by the molded shell 1 can be determined for the respective application purpose of this flow guiding body according to the invention. The best results with respect to the occurring flow field downstream of the flow guiding body 1 were achieved when the curve 3*b* did not have significant corner points; that is, with the exception of the marginal edges, the surface of the flow guiding body does not have other shape edges. The above-mentioned generator angle α, which is the result of the constructive design, is explicitly illustrated in FIG. 3.

Figure 3:
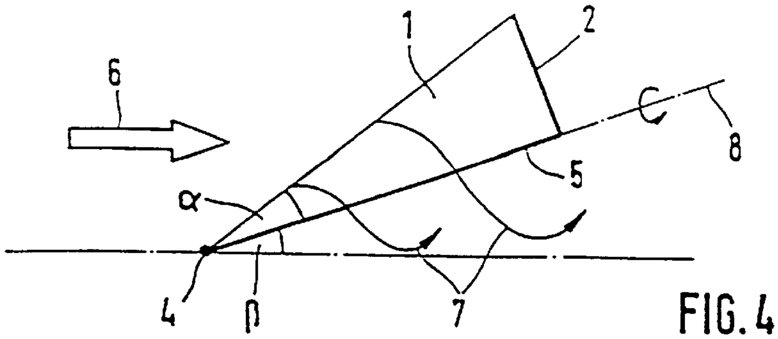
FIG. 3 is a lateral view of the molded shell or of the flow guiding body which shows the angle of attack, the generating angle, as well as the trajectory of individual flow lines.

FIG. 3 also shows the so-called angle of attack β by which the plane 5 of the molded shell 1 defined by the tip 4 as well as by the straight line 3*a* is inclined with respect to the approach flow direction of the fluid flow. The flow impinging on the flow guiding body or the molded shell 1 is illustrated by the flow vector 6. As illustrated, the fluid flow 6 flows against the molded shell 1 on its convex side, in which case the flow lines 7 are formed which are outlined in FIGS. 1, 3.

Figure 2:
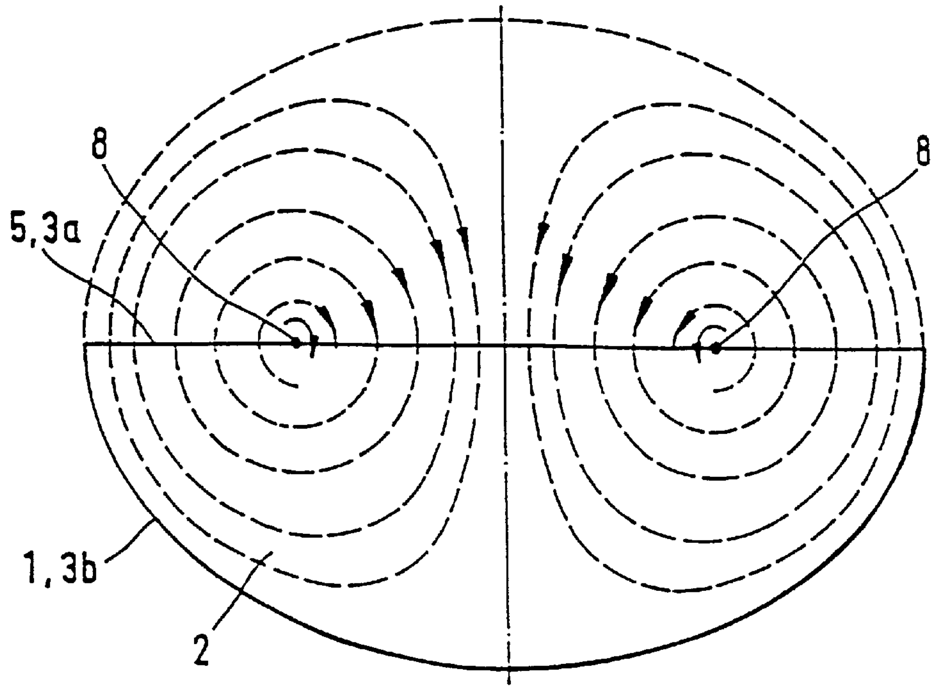
FIG. 2 is a sectional view of the shell perpendicular to the main flow direction showing the swirl field induced by the molding shell.

On the concave side of the molded shell 1, a swirling flow field is formed which is illustrated as a sectional view in FIG. 2 perpendicularly to the main flow direction of the fluid flow 6. This swirl field has two vortex cones 8 which rotate in opposite directions. Because of the design, particularly of the curve 3*b*, these two vortex cones 8 flow apart downstream of the flow guiding body 3; that is, they diverge. To this extent, this flow guiding body 1 differs significantly from a delta wing which is known per se and which generates converging vortex cones.

Figure 4:
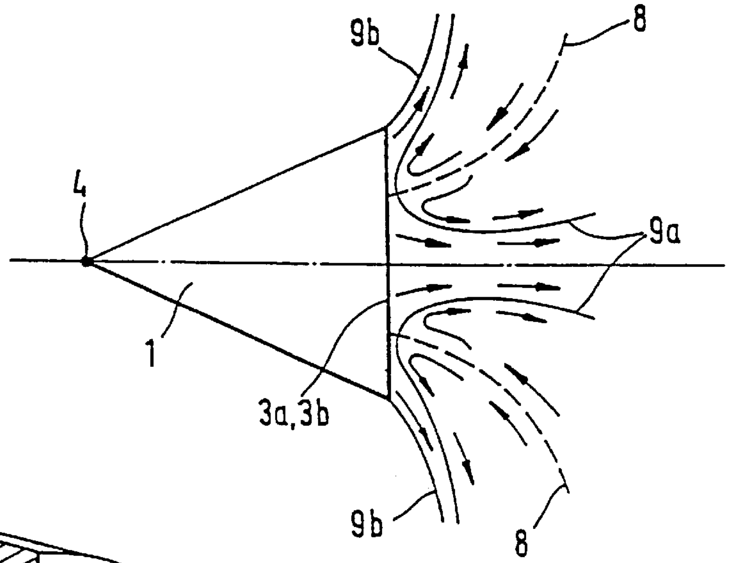
FIG. 4 is a top view of the molded shell or of the flow guiding body showing schematically a pair of vortices featuring vortex breakdown.

The circulation of the vortex cones 8 depends on the setting angle β. If the swirl is sufficiently high, the vortex cones 8 may break down downstream of the molded shell 1, as illustrated in FIG. 4. In this case, a recirculation zone is formed which has an inner boundary surface 9*a* to the centrally continuing main fluid flow. In addition, the rotating fluid has an outer boundary surface 9*b* to the surrounding main fluid flow which is displaced only with a curving of its flow lines.

Figure 5:
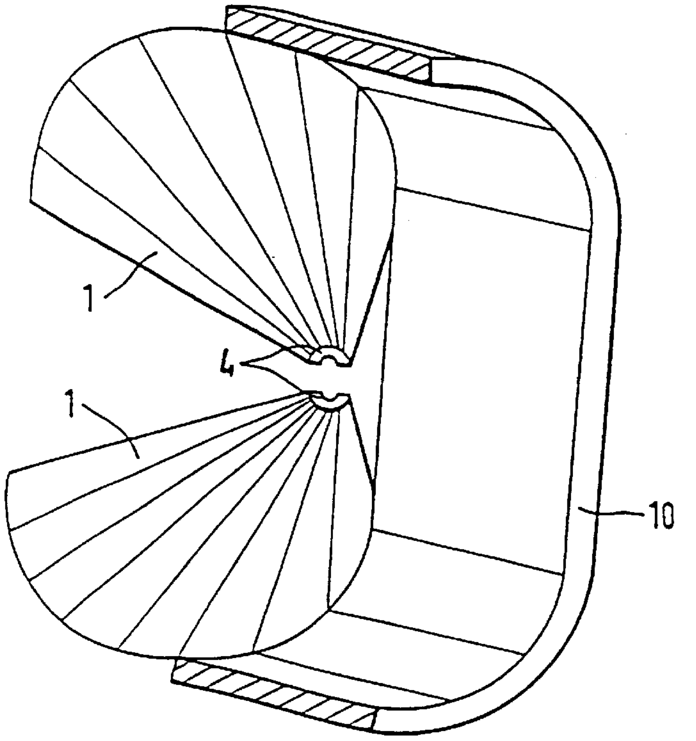
FIG. 5 is a view of a so-called double shell atomizer, consisting essentially of two flow guiding bodies, for explaining the principles of arrangement.

FIG. 5 illustrates a preferred application of a flow guiding body according to the invention. In this case, two molded shells 1 are arranged adjacent to one another, but spaced apart from one another, and are surrounded by a housing 10 which is illustrated in a broken-open manner. Each of the two molded shells 1 is set by the angle of attack β with respect to the horizontal line which is identical to the flow direction of the fluid flow, such that the planes 5 of these molded shells 1, which were defined in FIG. 3, enclose the angle 2β between one another. This so-called "double-shell atomizer", which is illustrated in FIG. 5 and which therefore essentially consists of two flow guiding bodies according to the invention, represents an air sprayer with a flame holder, in which case liquid fuel is usefully applied to the convex side of the two molded shells 1. As desired, the flow develops on the rear of the molded shells 1, the fluid flow passing through between these molded shells 1 through the angle segment described by the angle 2β essentially on the left side and the right side of the bisecting line of the molded shells. Deviating from the illustrated arrangement, the two shells 1 may also have a common tip 4.

In addition, gaseous or solid fuels may also be applied to the convex sides or outer sides of the molded shells 1. The illustrated arrangement then acts as a mixer with a flame holder. In each case, a stabilizing of the flame will be achieved as the result of the recirculation zone within the split-open swirl twists (compare reference number 8) explained in conjunction with FIG. 4.

Figure 6:
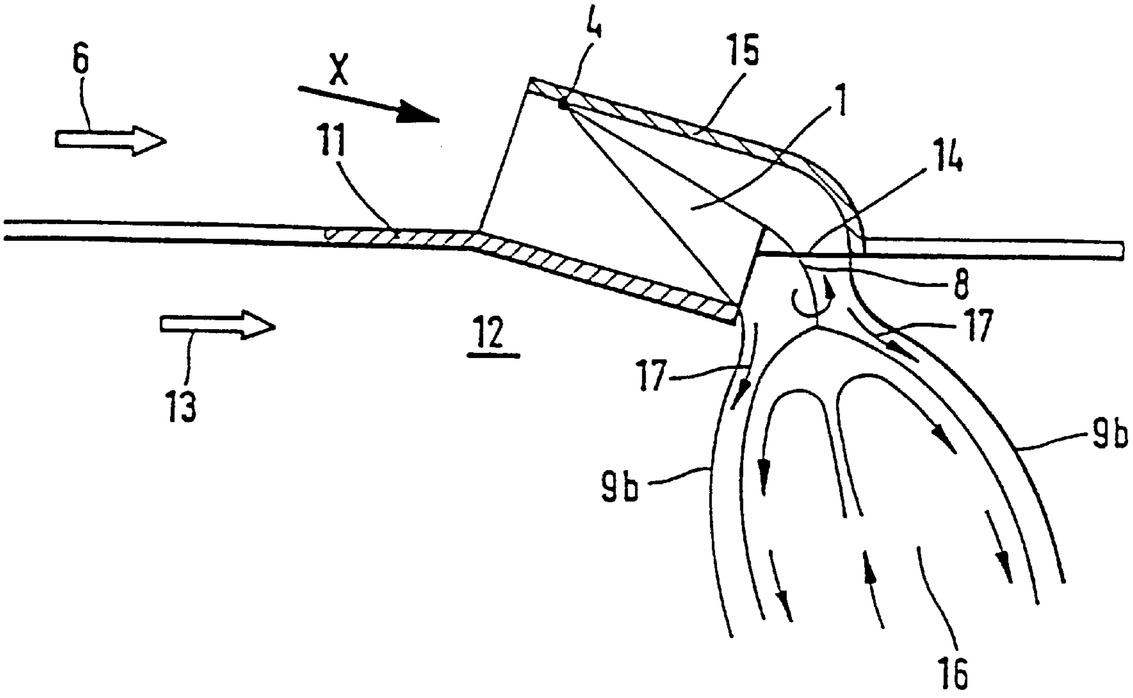
FIG. 6 is a lateral view of a first application according to the invention of such a flow guiding body on a gas turbine combustion chamber, such a molded shell being shown in the area of the admixing air holes of a gas turbine combustion chamber wall.
Figure 7:
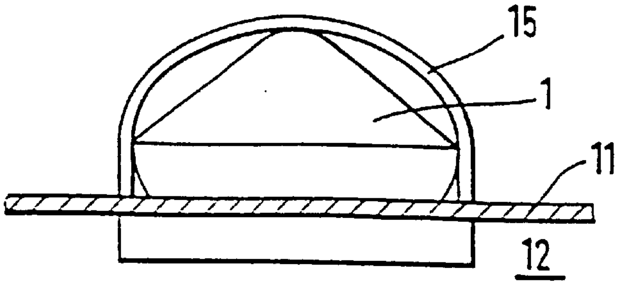
FIG. 7 is a view taken in the direction X of FIG. 6.

If, in addition, the swirling flow field of the molded shell or molded shells 1 is set perpendicularly to a second main flow, a fast mixing of air in gas turbine combustion chambers can, for example, be achieved. This second main flow represents the hot gas and is pulled into the recirculation zone of the broken down vortex cones 8. In this case, the hot gas mixes with the fresh gas on the boundary surfaces 9*a*, 9*b* (compare FIG. 4). FIGS. 6 and 7 show how a molded shell 1 according to the invention can be arranged on the combustion chamber wall of a gas turbine in order to mix the admixed air optimally with the hot gas within the combustion chamber.

In FIGS. 6 and 7, the molded shell again has the reference number 1, while the combustion chamber wall has the reference number 11. Within the combustion chamber 12 bounded by the combustion chamber wall 11, the hot gas flows in the direction of the arrow 13. As known, admixed air is to be added to this hot gas flow 13. In this case, the mixing air flow 6 is guided to approach as fluid flow impinging on the molded shell 1 outside the combustion chamber 12 along the combustion chamber wall 11 and can enter the combustion chamber 12 by way of an opening 14 in the combustion chamber wall 11. In order to achieve the desired flow of the admixed air flow 6, the molded shell 1 is surrounded by a scoop 15 which catches a portion of the arriving air flow 6 and diverts it in the direction of the opening 14. For this purpose, the curved scoop 15 is arranged on the outer side of the combustion chamber wall 11 such that the opening 14 is surrounded.

This arrangement has the following purpose. While, in the case of the known state of the art, the mixing of mixing air frequently takes place such that two or more air jets meet in a stagnation point and generate a turbulence there causing a strong hot gas slip between the air jets, in the case of the arrangement according to the invention, the admixed air is swirling. The disadvantage which exists in the known state of the art which is that the air jets will split into air bubbles in the stagnation point area, which are carried away by the hot gas flow and therefore mix slowly, is avoided by means of a molded shell according to the invention which operates as a swirl generator. As explained above, as well as here, vortex cones 8 are generated by the molded shell 1 which break down when the swirl is sufficiently high, whereby the flow field illustrated in FIG. 6 is formed, with the recirculation zone 16 which is surrounded by the admixed air 17. The improvement with respect to the mixing effect in comparison to the known state of the art is achieved by the following effects. The cold admixed air 17 again forms an outer boundary surface 9*b* with the hot gas flow 13. Since the admixed air 17 is highly swirling and has a high density in comparison to the fuel gas 13, centrifugal and lift forces in the area of these boundary surfaces 9*b* result in a fast and intensive rearrangement of both air masses which lead to a fine-grained turbulence and a fast mixing. The area of the boundary surface 9*b* is many times as large as the surface between the hot gas and the admixed air formed in the case of the previous state of the art. This considerably reduces the hot gas slip through the admixing plane.

Figure 8:
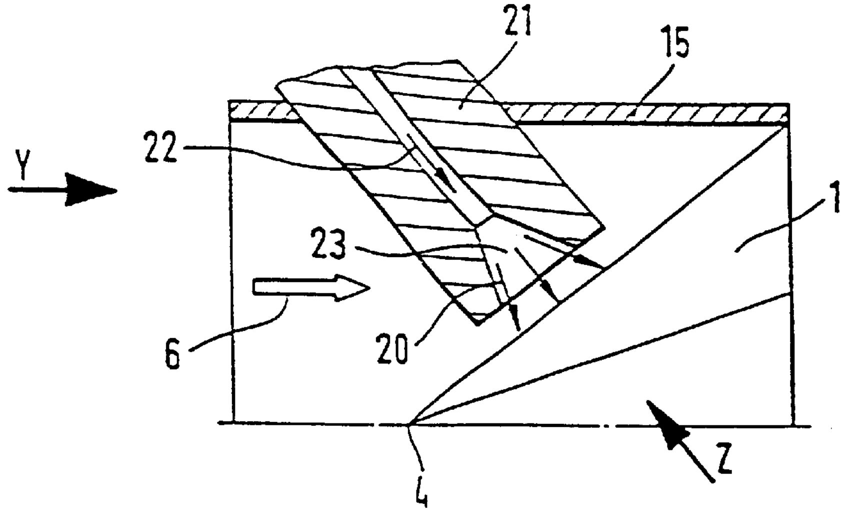
FIG. 8 is a lateral sectional view of a use of a flow guiding body according to the invention with a so-called fuel film layer on a gas turbine combustion chamber.
Figure 9:
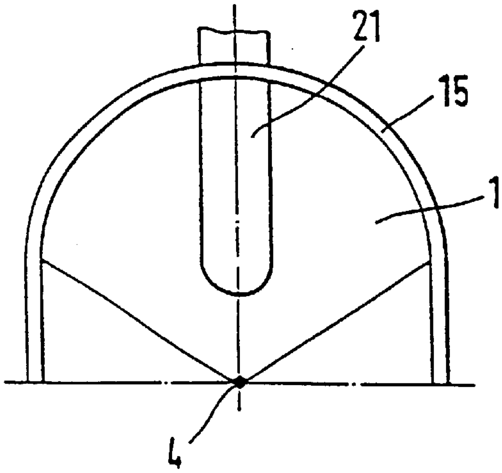
FIG. 9 is a view taken in the direction of Y from FIG. 8.
Figure 10:
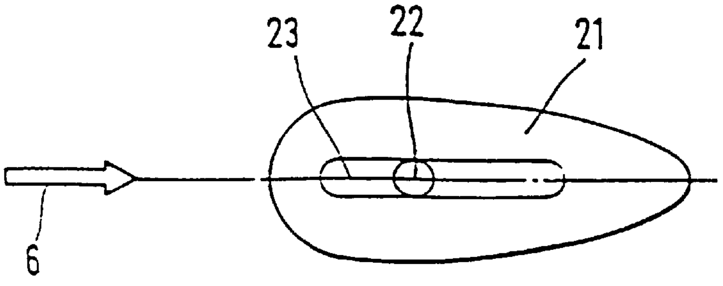
FIG. 10 is a view taken in the direction of Z from FIG. 8.

Another application of a molded shell 1 according to the invention, or a flow guiding body according to the invention, is illustrated in FIGS. 8 to 10. Here also, the molded shell 1 is arranged in the flow path of two fluid flows, specifically of an air flow 6 as well as of a fuel flow 20 and acts as a so-called "shell atomizer" for a fuel injector. As illustrated in FIGS. 8, 9, in this case, the molded shell 1 is again surrounded by a jacket-shaped scoop 15 in which the fuel film layer 21 is arranged. The fuel film layer 21 has a fuel duct 22 which ends in a flat funnel 23 (see FIG. 10). As in the previous embodiments, the fluid flow 6 also flows against the illustrated shell atomizer arrangement.

For the function of the fuel film layer 21, it is important that, as illustrated in FIG. 9, the latter is situated in the plane of symmetry of the molded shell 1. Furthermore, it is important that the opening or the flat funnel 23 of the film layer 21 is situated at a narrow distance from the surface of the molded shell 1, as illustrated in FIG. 8. As a result, it is achieved that the emerging fuel flow 20, immediately after leaving the film layer 21, is diverted without any atomization, onto the surface/contour of the molded shell 1. As a result, a desired fuel distribution can be adjusted on the molded shell 1. FIG. 10 is the view taken in the direction of arrow Z from FIG. 8 of the fuel film layer 21. The fuel duct 22 as well as the flat funnel 23 are visible. Expediently, the outer contour of the film injector 21 is shaped aerodynamically, as illustrated.

Instead of a fuel film generator, one or several fuel pressure atomizers with an arbitrary atomizing characteristic can also be arranged in connection with a molded shell 1 (flow guiding body) according to the invention in order to achieve a favorable air-fuel mixing. Analogously to the film generator, a pressure atomizer also applies fuel to the convex side of the molded shell 1.

Figure 11:
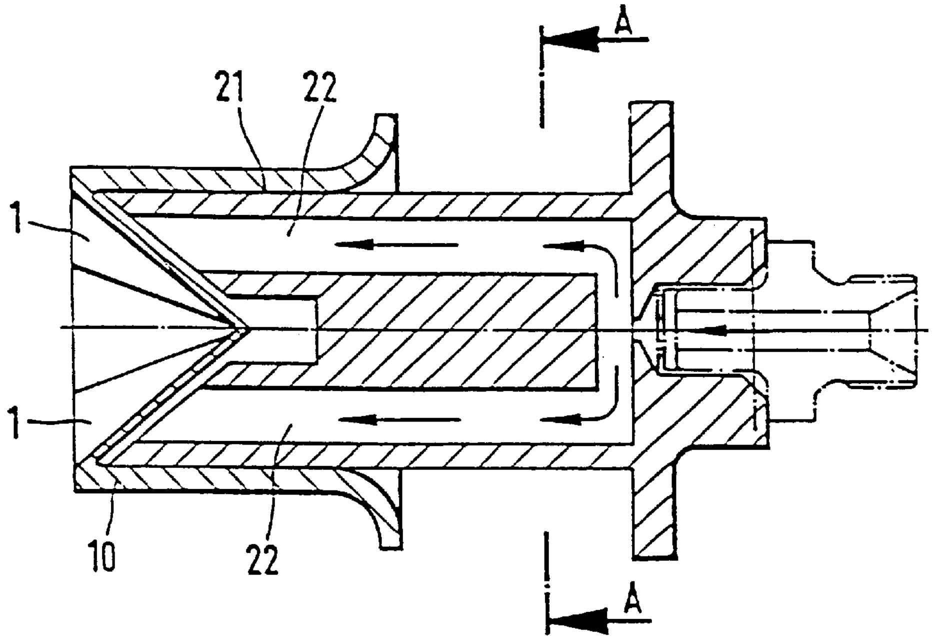
FIG. 11 is a view of another embodiment showing a fuel film layer according to the invention on a gas turbine combustion chamber.
Figure 13:
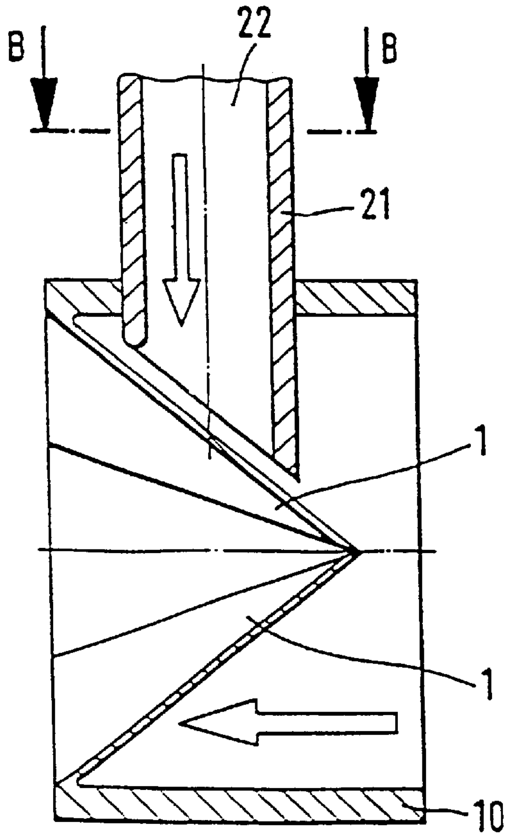
FIG. 13 is a view of another variant of a double shell atomizer having a fuel film layer according to the invention.
Figure 12:
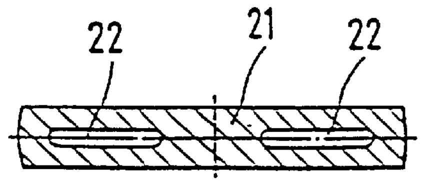
FIG. 12 is a sectional view taken along line A—A from FIG. 11.
Figure 14:
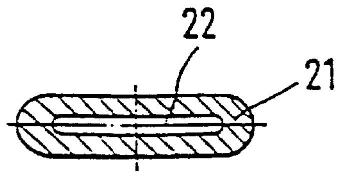
FIG. 14 is a sectional view taken along line B—B from FIG. 13.

FIGS. 11 and 13 show additional embodiments of a double shell atomizer which consists of two molded shells 2 and a fuel film layer 21. As an alternative, pressure atomizers can be provided in place of the fuel film layer. FIGS. 12 and 14 are corresponding sectional views of FIGS. 11 and 13, respectively. In this case, FIG. 11 shows a double shell atomizer which is acted upon on two sides and has two molded shells, similar to FIG. 5. In a suitable film generator 21, the fuel is distributed to two ducts 22 (here without any flat funnel 23). However, it is also possible to act upon the double shell atomizer only on one side, as illustrated by FIGS. 12 and 14.

Thus, the flow guiding body according to the invention and the molded shell 1 according to the invention, in the last-discussed embodiments, therefore operate in connection with a fuel film generator 21 as a shell atomizer. In this case the fuel can be fed through one or more fuel ducts 22. The fuel ducts 22 optionally lead into one or more flat funnels 23, and the sprayer or the molded shell 1 being arranged at a narrow distance form the flat funnel 23 or form the mouth of the ducts 22. The film generator 21 is situated in the plane of symmetry of the molded shell(s). In addition, a flow guiding body or a molded shell 1 according to the invention can also be used as a swirling element which will then particularly consist of one or more arbitrarily shaped molded shells 1 as well as of one or more matching scoops 15. This arrangement can be used for the admixing and swirling of cold air in the case of gas turbine combustion chambers. This arrangement may be mounted at any point on the flame tube of arbitrary combustion chambers in any position. Generally, this (these) conical molded shell(s) of the shape illustrated in FIG. 1 may have any cross-section, in which case the jets leading from the tip 4 to the base or base surface 2 of the conical cutout do not have to be straight lines. As explained in detail, this molded shell 1 can be used as an air sprayer for any liquid fuels. However, the use as a mixing element and flame holder is also possible when gaseous or powdered or granulated solid fuels of any type are used. In addition, naturally, any different gas or fluid flows can also be mixed with one another.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Flow guiding body on a gas turbine combustion chamber for swirling an impinging air flow, comprising:

at least one acutely tapering molded shell having a substantially conical design, a surface area projection of said molded shell being formed by at least one straight line as well as an arbitrary curve which connects end points of said one straight line;

wherein a tip of said molded shell faces the impinging air flow which impinges on an outer surface of said molded shell;

a scoop arranged on an outer side of a wall of said combustion chamber, said scoop surrounding said molded shell such that, by way of an opening enclosed by said scoop, the impinging air flow is admixed to a hot gas flow flowing in said combustion chamber.

2. Flow guiding body according to claim 1, wherein a plane of said molded shell defined by said tip and said straight line is inclined with respect to an approach flow direction of the impinging air flow.

3. Flow guiding body according to claim 1, further comprising at least one additional molded shell arranged adjacent to the acutely tapering molded shell but spaced apart from one another at least in areas.

4. Flow guiding body according to claim 2, further comprising at least one additional molded shell arranged adjacent to the acutely tapering molded shell but spaced apart from one another at least in areas.

5. Flow guiding body on a gas turbine combustion chamber for swirling an impinging air flow, comprising:

at least one acutely tapering molded shell having a substantially conical design, a surface area projection thereof being formed by at least one straight line as well as an arbitrary curve connecting end points of said one straight line;

wherein said molded shell has a tip which faces the impinging air flow which impinges on an outer surface of said molded shell;

a scoop arranged to surround said molded shell;

one of a fuel film layer and a fuel pressure atomizer combined with said scoop, wherein said fuel is applied to the outer surface of said molded shell, said fuel being fed to said combustion chamber together with the impinging air flow.

6. Flow guiding body according to claim 5, wherein a plane of said molded shell defined by said tip and said straight line is inclined with respect to an approach flow direction of the impinging air flow.

7. Flow guiding body according to claim 5, further comprising at least one additional molded shell arranged adjacent to the acutely tapering molded shell but spaced apart from one another at least in areas.

8. Flow guiding body according to claim 6, further comprising at least one additional molded shell arranged adjacent to the acutely tapering molded shell but spaced apart from one another at least in areas.

9. A mixing apparatus for a combustion chamber, comprising:

a molded shell having a substantially conical design, a tip of said molded shell facing an impinging air flow;

an air scoop surrounding said molded shell, said air scoop being arranged on an outer wall of the combustion chamber to enclose an opening, through which opening the impinging air flow is fed into and admixed to a hot gas flow flowing in said combustion chamber.

10. A fuel feed device for a combustion chamber, comprising:

a molded shell having a substantially conical design, a tip of said molded shell facing an impinging air flow;

an air scoop surrounding said molded shell;

one of a fuel film layer and a fuel pressure atomizer combined with said molded shell;

wherein fuel applied to an outer surface of said molded shell from said one of said fuel film layer and said fuel pressure atomizer is fed to the combustion chamber together with the impinging air flow.

* * * * *